United States Patent [19]

Ryan et al.

[11] Patent Number: 4,526,766

[45] Date of Patent: Jul. 2, 1985

[54] PRODUCTION OF RED PHOSPHORUS

[75] Inventors: Kevin P. Ryan, Gloucester; Carl D. Yank, Buckingham, both of Canada

[73] Assignee: ERCO Industries Limited, Islington, Canada

[21] Appl. No.: 560,962

[22] Filed: Dec. 13, 1983

[51] Int. Cl.³ .................. C01B 25/01; C01B 25/02; C01B 25/04

[52] U.S. Cl. .................................. 423/322; 423/323

[58] Field of Search ............................... 423/322, 323

[56] References Cited

U.S. PATENT DOCUMENTS 2,476,335  7/1949  Tusson ................................ 423/322
4,081,333  3/1978  Holmes et al. ...................... 423/322
4,152,403  5/1979  McGilvery et al. ................. 423/322
4,188,367  2/1980  McGilvery .......................... 423/322

Primary Examiner—Gregory A. Heller
Attorney, Agent, or Firm—Sim & McBurney

[57] ABSTRACT

Red amorphous phosphorus is formed by thermal conversion of yellow phosphorus by a process wherein thermal conversion is effected while simultaneously the heat of conversion is permitted to effect evaporation of yellow phosphorus. The evaporated yellow phosphorus is condensed, collected and used in a subsequent conversion batch. The red amorphous phosphorus is obtained substantially free from residual unconverted yellow phosphorus and in a physical form which allows ready further processing to particulate form.

7 Claims, 2 Drawing Figures

PRODUCTION OF RED PHOSPHORUS

FIELD OF INVENTION

The present invention relates to the production of red amorphous phosphorus by thermal conversion of yellow phosphorus.

BACKGROUND TO THE INVENTION

The production of red amorphous phosphorus by the thermal conversion of yellow phosphorus is well known. In one commercial operation, such conversion is achieved by heating a batch of yellow phosphorus in an enclosed container until thermal conversion commences at about 270° to 280° C., thermal conversion is allowed to occur while cooling air or the like is used to remove the heat of conversion until the exotherm subsides, the container is further heated to a temperature of about 370° to 380° C. to achieve further conversion of the yellow phosphorus to red phosphorus, and the container then is cooled to room temperature, opened and the red phosphorus recovered.

The latter operation is a time consuming one, typically involving about 100 hours for each batch, and does not result in complete conversion of yellow phosphorus to red phosphorus, so that precautions must be taken to avoid release of unconverted yellow phosphorus to the atmosphere and provision for disposal of unconverted yellow phosphorus must be provided. In addition, the red phosphorus is obtained in the form of a hard cake-like compact mass which requires considerable mechanical action to remove the same from the container and to reduce it to particulate form.

Efforts have been made to improve on this prior art procedure, in particular to improve the efficiency of conversion of yellow phosphorus to red phosphorus and to provide the process as a continuous one, but to date none of these improvements have reached commercial operation. Representative patents covering such processes are U.S. Pat. Nos. 4,152,403 and 4,188,367.

SUMMARY OF INVENTION

In accordance with the present invention, there is provided a process of forming red amorphous phosphorus by thermal conversion of yellow phosphorus which is a redical departure from existing technology and efforts to date to improve thereon.

As mentioned above, the process of conversion of yellow phosphorus to red phosphorus is highly exothermic. In this invention, the heat so generated is permitted to effect volatilization of yellow phosphorus, so that the heat of conversion is dissipated by the volatilization. The volatilized yellow phosphorus is condensed outside the conversion vessel and the condensed yellow phosphorus can be used to form part of the next or subsequent batch which is converted to red phosphorus.

In the present invention, therefore, in complete contrast to prior art procedures, no attempt is made to confine the yellow phosphorus to prevent volatilization but rather volatilization is permitted to occur. The volatilization of yellow phosphorus serves to remove heat of conversion, thereby eliminating the necessity for the application of external cooling. At atmospheric pressure, the rate of conversion of yellow phosphorus to red amorphous phosphorus becomes significant at about 260° C. with the generation of approximately 86 kcal per kg of yellow phosphorus. Accumulation of the heat increases the mass temperature until the boiling point of yellow phosphorus is reached at 280° C. The temperature stabilizes at the boiling point and vaporization of yellow phosphorus occurs, requiring 96 kcal per kg of yellow phosphorus evaporated.

In the present invention, therefore, two processes occur simultaneously, namely thermal conversion of yellow phosphorus to red phosphorus and volatilization of yellow phosphorus which removes the heat of conversion. The volatilized yellow phosphorus can readily be collected by condensation and recycled, so that there is no overall loss of yellow phosphorus. Although a substantial proportion of the initial yellow phosphorus is volatilized, this is not disadvantageous.

The physical form of the red amorphous phosphorus which results in this invention is considerably different from that produced in the prior art. As noted above, in the cited prior art procedure, the red phosphorus is formed as a hard compact mass which requires considerable physical effort to remove the same from the container and reduce it to particulate form. The red phosphorus product of this invention, in contrast, has considerable porosity and is soft. The product is readily removed from the reaction vessel and requires very little effort to provide the same in useful particulate form.

In a preferred embodiment of the invention, the overall rate of production of red amorphous phosphorus is improved, as compared with the cited prior art process, despite the necessity in the present invention to recover and recycle a considerable proportion of the initial charge of yellow phosphorus. In this preferred embodiment, the charge of yellow phosphorus is provided in a container which is introduced into a partially preheated reaction vessel. The contents of the container then are rapidly heated to a temperature at which the rate of conversion becomes significant by increasing the temperature of the reaction vessel. The evaporated yellow phosphorus is removed from the reaction vessel and condensed while conversion to red phosphorus occurs in the container. Once the conversion reaction is complete, the container may be removed from the reaction vessel without the necessity of awaiting complete cooling of the reaction vessel. The container containing converted red phosphorus is cooled outside the reaction vessel while a further batch of yellow phosphorus can be fed to the reaction vessel for conversion. An inert gas, such as, nitrogen, usually is passed into the container to flush phosphorus vapour therefrom and to provide an inert atmosphere during cooling. This semicontinuous type mode of operation considerably decreases the overall processing time necessary to produce red phosphorus.

In this preferred procedure, the container housing the yellow phosphorus may take the form of an openable closed container having a vent for evaporated yellow phosphorus which communicates with a vapor outlet of the reaction vessel, which in turn communicates with a yellow phosphorus condensation procedure. Rapid heating of the container within the reaction vessel may be effected using any convenient heat source, such as, molten lead.

DESCRIPTION OF PREFERRED EMBODIMENT

Figure 1:
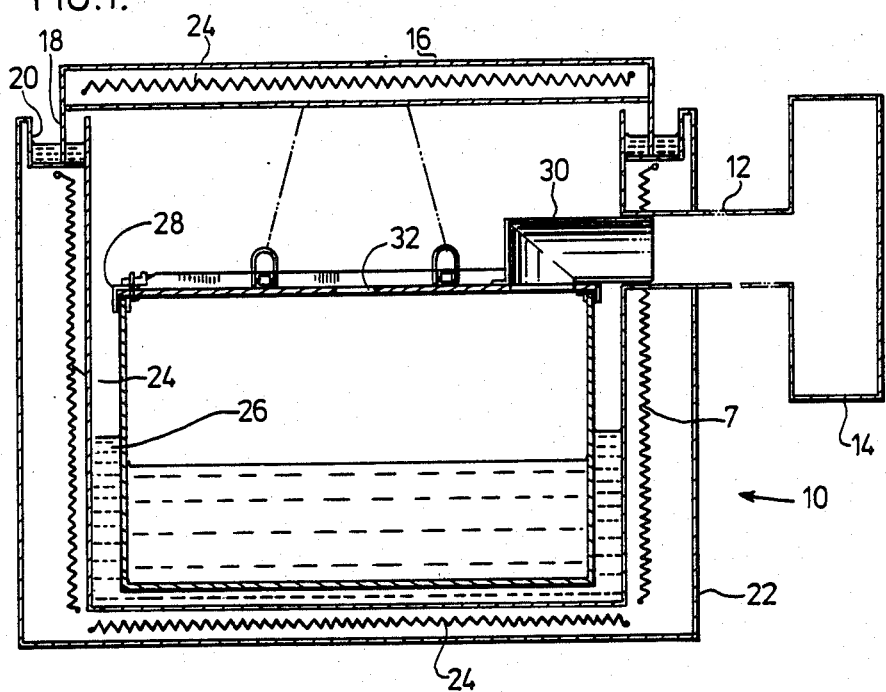
FIG. 1 is a schematic elevational view of one embodiment of apparatus for carrying out the process of the invention.
Figure 2:
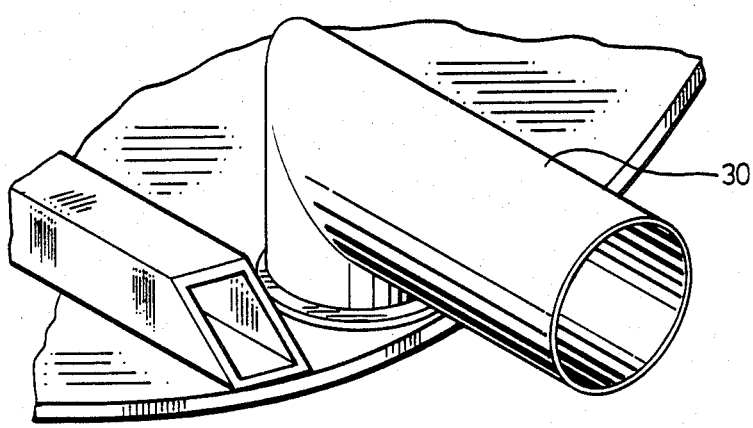
FIG. 2 is a close-up of a portion of the apparatus of FIG. 1.

Referring to the drawings, a yellow-to-red phosphorus conversion reactor 10 is provided. This reactor is a modified form of the piece of equipment disclosed in U.S. Pat. No. 4,081,333 which is used for the distillation of small quantities of phosphorus from phosphorus mud, a by-product of the conventional thermal conversion process, at high temperatures of typically from about 400° to about 600° C.

The conversion reactor 10 has a vapor outlet 12 which communicates with a condenser 14 for condensation of evaporated yellow phosphorus. The reactor 10 has a lid 16 having depending peripheral flange 18 which is received in a channel 20 formed at the top of the vessel walls 22 to effect sealed closure of the reactor 10. Electrical heating elements 24 are embedded in the base, walls and lid of the reactor 10 to effect heating of the reactor and its contents. The reactor 10 contains a supply of molten lead 26 to act as a heat transfer agent.

The use of molten lead in this illustrated embodiment of the invention is but one example of a wide variety of heating sources which may be used to effect thermal conversion of yellow phosphorus. Other heat transfer media which are liquid at the desired temperatures may be used, or, alternatively, an electrically-heated plate may be used.

When used to effect thermal conversion of yellow to red phosphorus a portable skip 28, housing the yellow phosphorus, is positioned in the reactor 10 suspended from the lid 16 and in contact with the molten lead 26. The skip 28 is an enclosed container and has a vapor off-take pipe 30 communicating with the vapor outlet 12. The skip 18 may also be provided with a central opening 32 for the passage of inert gas to the skip 28 to remove phosphorus vapor from the skip upon completion of the reaction.

OPERATION

In operation of the illustrated apparatus, the skip 28 is filled with yellow phosphorus, usually under a water blanket, and closed. The lead means 26 is heated to a temperature above its melting point and to a temperature such that the sensible heat of the molten lead is sufficient to effect the desired heating of the skip 28, typically to about 450° C., and the skip 28 is suspended from the lid 16 and inserted into the reactor 10 in contact with the bath of molten lead with the vapor off-take pipe 30 in communication with the vapor outlet 12.

As energy is absorbed by the skip 28 and its contents, the lead cools and its temperature stabilizes at the set point of 290° C. When the contents of the skip 28 heat up to 100° C., evaporation of the water occurs, forming an inert atmosphere within the skip 28 and also the reactor 10. Once all the water has been evaporated, the residual yellow phosphorus is heated by the molten lead to the boiling point of yellow phosphorus at 280° C.

Simultaneous conversion of yellow phosphorus to red phosphorus and evaporation of yellow phosphorus occur at this temperature. The evaporated yellow phosphorus is conducted by off-take pipe 30 to the vapor outlet 12 and thence to the condenser 14 for condensation therein. The use of the off-take pipe 30 minimizes phosphorus deposits on the inner walls of the reactor.

The distillation of yellow phosphorus is prominent during the early stages of the reaction and the reaction rate may be measured as a function of the quantity of yellow phosphorus recovered in the condenser 14.

Monitoring of the reaction temperatures, quality of sampled vapors and the rate of recovery of yellow phosphorus in the condenser 14 may be used to determine the termination of the conversion reaction. The lead bath 26 then is heated to a temperature above the atmospheric pressure boiling point of yellow phosphorus and preferably to about 320° to 330° C., to effect volatilization of residual quantities of yellow phosphorus. The reactor 10 is opened and the skip 28 is lifted from the reactor. A purge of nitrogen or other inert gas is inserted through the cover of the skip 28 through opening 32 to drive out the last traces of phosphorus vapour and to ensure that an inert atmosphere is maintained during cooling. The skip 28 is detached from the lid 16 and allowed to cool.

Once the skip 28 is detached from the lid 16, a further skip containing yellow phosphorus may be attached thereto and inserted into the reactor 10, after the lead has been reheated to its initial temperature. Conversion of a further batch of yellow phosphorus to red phosphorus, therefore, can be effected while the first batch is still cooling, thereby considerably decreasing the overall processing time. In a typical operation, the 280° C. temperature is reached in about 7 hours, thermal conversion and yellow phosphorus evaporation occurs for about 7 hours at 280° C., heating to 320° C. takes about 6 hours and subsequent heating at about 320° to 330° C. is effected for about 5 hours, providing a total processing time of 25 hours compared with about 100 hours for the typical commercial operation discussed above.

The condensed yellow phosphorus collected in the condenser 14 may be reutilized in a subsequent batch conversion.

When the skip 28 has cooled sufficiently, water is normally added and the cover is removed for access to the red amorphous phosphorus. The red amorphous phosphorus is obtained as a soft crumbly mass which requires little further processing to provide the desired particulate form. It is somewhat surprising that the red amorphous phosphorus is obtained in such a useful from directly from the conversion process.

EXAMPLES

Example

Thermal conversion of yellow phosphorus to red amorphous phosphorus was carried out using the apparatus of FIG. 1. A 10 foot diameter and 2 foot 10 inches deep skip was charged with 4250 kg of yellow phosphorus (12½ inch depth) and covered with 70 kg (¼ inch) of water. The lead bath in the reactor was heated to 450° C. and the skip was lowered into the reactor into contact with the molten lead bath. Throughout the experiment, a purge of nitrogen of 7.6 cu.ft/min was maintained.

Temperature sensors were applied to the skip and located in the molten lead and the temperatures monitored. In addition, the quality of the off-gas stream and the quantity of condensate collected were monitored during the process. The temperature in the skip initially rose to 100° C. at which temperature evaporation of the water occurred. Thereafter with the lead bath temperature having dropped to 290° C., the temperature of the phosphorus rose to 280° C. at which temperature the bulk of the conversion of yellow phosphorus to red phosphorus and evaporation of yellow phosphorus occurred. Upon completion of the conversion, the lead bath temperature was raised to 330° C. to effect further distillation of unconverted yellow phosphorus. The skip thereafter was removed from the reactor and air and water cooled to ambient temperature. The temperature/time profile is reproduced in the following Table I:

TABLE I

| Temperature (°C.) | | Time | |
|---|---|---|---|
| Skip | Lead | (hrs) | Notes |
| 20 | 450 | 0 | |
| 100 | 400 | 0.5 | Evaporation of water commenced |
| 100 | 350 | 2 | |
| 110 | 350 | 3.5 | Evaporation of water ceased |
| 280 | 290 | 7 | RAP conversion commenced |
| 280 | 290 | 13 | RAP conversion ceased |
| 330 | 330 | 19 | Residual $P_4$ distillation commenced |
| 330 | 330 | 24 | Residual $P_4$ distillation ceased |
| 20 | — | 30 | |

The red amorphous product obtained was a reddish colour, porous and easily fractured and occupied a depth of 7½ inches in the skip, indicating a bulk density of 1.014 g/cc. 1550 kg of red amorphous phosphorus was obtained, corresponding to 36.5 wt% of the initial charge. 2550 kg of yellow phosphorus were collected in the condenser, corresponding to 60 wt% of the initial charge. Total power consumption during the run was 1526 KWhr, or approximately 1000 KWhr/tonne of red amorphous phosphorus, which is considerably less than a typical power consumption of 3000 KWhr/tonne of red amorphous phosphorus in the case of the cited prior art procedure.

Samples of the red amorphous phosphorus from different parts of the skip were tested for residual yellow phosphorus content. The results are reproduced in the following Table II:

TABLE II

| No. | Sample Location | $P_4$ (ppm) |
|---|---|---|
| 1 | Core at top | 258 |
| 2 | Core at bottom | 230 |
| 3 | at surface on opposite side from take-off port | 229 |
| 4 | at surface below take-off line | 195 |
| 5 | at surface at edge | 206 |

The results reproduced in Table II indicate a relatively low residual yellow phosphorous content in all samples.

SUMMARY OF THE INVENTION

In summary of this disclosure, the present invention provides a novel method of forming red amorphous phosphorus which does not suffer from the drawbacks of the cited prior art procedure and permits formation of the product in a readily-processable form in a much shorter reaction cycle. Modifications are possible within the scope of this invention.

We claim:

1. A process for the production of red amorphous phosphorus, which comprises:
    providing a mass of yellow phosphorus in an enclosed thermal conversion zone at ambient temperature,
    heating said mass of yellow phosphorus to the boiling point thereof using a liquid heat transfer medium, said liquid heat transfer medium being in heat transfer relationship with said mass of yellow phosphorus and having an initial temperature sufficient to permit said yellow phosphorus to be heated thereby from said ambient temperature to said boiling temperature,
    said heating of said yellow phosphorus to said boiling point initiating thermal conversion of yellow phosphorus to red phosphorus at said boiling point of yellow phosphorus, said thermal conversion producing exothermic heat of conversion,
    permitting said thermal conversion to occur while simultaneously permitting yellow phosphorus to evaporate so as to remove said heat of conversion from said mass, said thermal conversion being permitted to continue until the degree of conversion of yellow phosphorus to red phosphorus no longer generates sufficient heat of conversion to evaporate yellow phosphorus from said mass, and
    collecting the evaporated yellow phosphorus by removing the same from said thermal conversion zone and condensing the removed yellow phosphorus.

2. The process of claim 1 wherein said heat transfer medium is molten lead, and said molten lead cools from an initial temperature towards its set point as said yellow phosphorus is heated to the boiling temperature.

3. A process for the production of red amorphous phosphorus, which comprises:
    confining a mass of yellow phosphorus covered with water in an enclosed thermal conversion zone,
    introducing the enclosed thermal conversion zone into a reaction zone in heat conducting relationship with a body of molten lead having an elevated temperature,
    establishing a vapor flow path from said enclosed thermal conversion zone to exterior of said reaction zone,
    heating said thermal conversion zone by said molten lead as said lead cools from said elevated temperature to a set point of about 290° C. to effect firstly evaporation of said water from the enclosed thermal conversion zone and subsequently simultaneous thermal conversion of yellow phosphorus to red amorphous phosphorus and evaporation of yellow phosphorus at the ambient atmospheric pressure boiling point thereof until the degree of said thermal conversion no longer generates sufficient heat of conversion to evaporate yellow phosphorus,
    conveying said evaporated yellow phosphorus through said vapor flow path and condensing said conveyed yellow phosphorus external the reaction zone,
    heating said lead and said thermal conversion zone to a temperature above the atmospheric pressure boiling point of yellow phosphorus for a time sufficient to evaporate substantially all residual unconverted yellow phosphorus,
    removing said thermal conversion zone from said reaction zone, and
    recovering the red amorphous phosphorus from the thermal conversion zone.

4. The process of claim 3 wherein said ambient atmospheric pressure boiling point is above 280° C. and said temperature above the atmospheric pressure boiling point is about 320° C. to about 330° C.

5. The process of claim 3, wherein an inert gas stream is flowed into said thermal conversion zone to remove residual traces of yellow phosphorus vapour and to provide an inert atmosphere therein.

6. The process of claim 5 wherein said thermal conversion zone is cooled and opened to permit said recovery of red amorphous phosphorus after removal from said reaction zone.

7. The process of claim 6 including introducing a further enclosed thermal conversion zone to said reaction zone after removal of the first-mentioned enclosed thermal conversion zone and during cooling thereof.

* * * * *